US010180166B2

(12) United States Patent
Grosskopf et al.

(10) Patent No.: US 10,180,166 B2
(45) Date of Patent: Jan. 15, 2019

(54) DISCONNECT MECHANISMS

(71) Applicant: Hamilton Sundstrand Corporation, Charlotte, NC (US)

(72) Inventors: Andrew P. Grosskopf, Rockford, IL (US); Aaron M. Finke, Janesville, WI (US); Duane C. Johnson, Beloit, WI (US); William B. Beard, Rockford, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 51 days.

(21) Appl. No.: 14/799,807

(22) Filed: Jul. 15, 2015

(65) Prior Publication Data

US 2017/0016489 A1 Jan. 19, 2017

(51) Int. Cl.
*F16D 11/14* (2006.01)
*F16D 23/12* (2006.01)
*F16D 11/04* (2006.01)

(52) U.S. Cl.
CPC .............. *F16D 23/12* (2013.01); *F16D 11/04* (2013.01); *F16D 11/14* (2013.01); *F16D 2023/123* (2013.01)

(58) Field of Classification Search
None
See application file for complete search history.

(56) References Cited

U.S. PATENT DOCUMENTS

| 876,053 | A | 1/1908 | Heard |
| 953,693 | A | 4/1910 | Heinss |
| 1,047,801 | A | * 12/1912 | Haney ...................... F16D 11/14 |
| | | | 192/69.62 |
| 1,116,385 | A | 11/1914 | Casgrain |
| 1,193,008 | A | 8/1916 | Leon |
| 1,367,309 | A | 2/1921 | Dunham |

(Continued)

FOREIGN PATENT DOCUMENTS

| DE | 822178 | 11/1951 |
| DE | 1159217 | 12/1963 |

(Continued)

OTHER PUBLICATIONS

European Patent Office Search Report in corresponding EP Application No. 16179688.3, dated Jan. 4, 2017.

(Continued)

*Primary Examiner* — Robert W Hodge
*Assistant Examiner* — Ryan P Dodd
(74) *Attorney, Agent, or Firm* — Locke Lord LLP; Scott D. Wofsy; Joshua L. Jones

(57) ABSTRACT

A disconnect mechanism includes an input shaft defining a drive axis. A disconnect shaft is selectably engaged with the input shaft to be driven about the drive axis by the input shaft. A disconnect ramp shaft is operatively connected to the disconnect shaft to axially move the disconnect shaft between a first axial position wherein the disconnect shaft is engaged to the input shaft and a second axial position wherein the disconnect shaft is disengaged from the input shaft. The disconnect ramp shaft includes a ramp defined around an outer surface thereof. A disconnect pawl is selectably engaged with the ramp of the disconnect ramp shaft to engage or disengage the disconnect shaft from the input shaft.

15 Claims, 5 Drawing Sheets

(56) References Cited

U.S. PATENT DOCUMENTS

| | | | |
|---|---|---|---|
| 1,885,420 A | | 11/1932 | Dorman |
| 2,104,265 A | | 1/1938 | Marsden |
| 2,224,192 A | | 12/1940 | Madsen |
| 2,642,970 A | * | 6/1953 | Szekely ................. F16D 11/04 192/109 R |
| 3,037,598 A | | 6/1962 | Stickney |
| 4,043,226 A | * | 8/1977 | Buuck ................. B60K 17/046 180/247 |
| 4,244,455 A | | 1/1981 | Loker |
| 5,085,305 A | * | 2/1992 | Cheng .................... F16D 11/14 192/69.82 |
| 5,103,949 A | | 4/1992 | VanderZyden |
| 8,568,089 B2 | * | 10/2013 | Lemmers, Jr. .......... F01D 11/10 415/122.1 |
| 2010/0283341 A1 | * | 11/2010 | Grosskopf ............. F01D 5/026 310/78 |
| 2014/0262670 A1 | * | 9/2014 | Combs ................... F16D 11/14 192/69 |

FOREIGN PATENT DOCUMENTS

| | | |
|---|---|---|
| DE | 1159217 B | 12/1963 |
| DE | 102011085839 | 5/2013 |
| GB | 1179617 | 1/1970 |
| GB | 1179617 A | 1/1970 |
| GB | 1520616 | 8/1978 |
| GB | 1520616 A | 8/1978 |

OTHER PUBLICATIONS

Extended European Search Report, issued in corresponding European Patent Application No. EP 16179688.3, dated Jan. 4, 2017.

Communication issued in corresponding European Patent Application No. EP 16179688.3, dated May 15, 2018.

* cited by examiner

DISCONNECT MECHANISMS

BACKGROUND OF THE INVENTION

1. Field of the Invention

The present disclosure relates to transmission of rotational power, and more particularly to disconnect mechanisms such as used in drivetrains for integrated drive generators that are used in gas turbine engines.

2. Description of Related Art

Aircraft rely on electrical, pneumatic, and hydraulic systems for secondary power. A typical electrical system utilizes an integrated drive generator (IDG) coupled to each engine to provide fixed frequency power to the distribution system and loads. One type of IDG includes a generator, a hydraulic unit, and a differential assembly arranged in a common housing. The differential assembly is operably coupled to a gas turbine engine via an input shaft. The rotational speed of the input shaft varies during the operation of the gas turbine engine. The hydraulic unit cooperates with the differential assembly to provide a constant speed to the generator throughout engine operation.

Such conventional methods and systems have generally been considered satisfactory for their intended purpose. However, there is still a need in the art for improved disconnect mechanisms for disconnecting the drive train when conditions warrant. The present disclosure provides a solution for this need.

SUMMARY OF THE INVENTION

A disconnect mechanism includes an input shaft defining a drive axis. A disconnect shaft is selectably engaged with the input shaft to be driven about the drive axis by the input shaft. A disconnect ramp shaft is operatively connected to the disconnect shaft to axially move the disconnect shaft between a first axial position wherein the disconnect shaft is engaged to the input shaft and a second axial position wherein the disconnect shaft is disengaged from the input shaft. The disconnect ramp shaft includes a ramp defined around an outer surface thereof. A disconnect pawl is selectably engaged with the ramp of the disconnect ramp shaft. In a first pawl position of the disconnect pawl the disconnect ramp shaft is in the first axial position. In a second pawl position of the disconnect pawl, the disconnect pawl engages the ramp of the disconnect ramp shaft to actuate the disconnect ramp shaft from the first axial position to the second axial position, disengaging the disconnect shaft from the input shaft.

The mechanism can include an input gear and a biasing member, wherein the disconnect shaft is seated in the input gear, and wherein the biasing member engages the input gear and disconnect shaft to bias the disconnect shaft toward the first axial position. The input shaft can include dog teeth, wherein the disconnect shaft includes dog teeth, wherein in the first axial position, the dog teeth of the disconnect shaft engage the dog teeth of the input shaft for common rotation, and wherein in the second axial position, the dog teeth of the disconnect shaft disengage the dog teeth of the input shaft for relative rotation. The disconnect ramp shaft can include a first axial end surface proximal to the input shaft and a second axial end surface distal from the input shaft, wherein the dog teeth define an axial end surface of the disconnect shaft, and wherein the axial end surface of the disconnect shaft is flush with or recessed relative to the first axial end surface of the disconnect ramp shaft.

The disconnect shaft can be seated within the disconnect ramp shaft. The disconnect shaft and disconnect ramp shaft can be threaded together with a thread direction configured to tighten with the disconnect pawl in the second pawl position. The disconnect ramp shaft can include at least one flat defined on an outer surface thereof for engagement of a tool to tighten threaded engagement of the disconnect shaft and the disconnect ramp shaft.

The disconnect shaft can be seated in an input gear as described above, wherein the disconnect shaft is splined to the input gear for common rotation with a degree of freedom for axial movement of the disconnect shaft relative to the input gear. The disconnect shaft can be seated within the disconnect ramp shaft, wherein each of the disconnect shaft and the disconnect ramp shaft define at least one radial passage therethrough for flow of lubricant from within the disconnect shaft to splines of the disconnect shaft and input gear outside the disconnect shaft.

The mechanism can include a pawl actuator operatively connected to release the disconnect pawl along a longitudinal pawl axis defined by the pawl for actuation of the disconnect pawl back and forth between the first and second pawl positions. The pawl axis can be perpendicular to the drive axis.

The disconnect ramp shaft can include an annular ramp body, e.g., defined around the drive axis. The disconnect ramp can define a radially extending ledge extending from the outer surface of the ramp body. The ramp can include a flat section that does not ramp axially, and a ramping section that ramps in the axial direction. The ramp can extend circumferentially 356 degrees around the ramp body.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
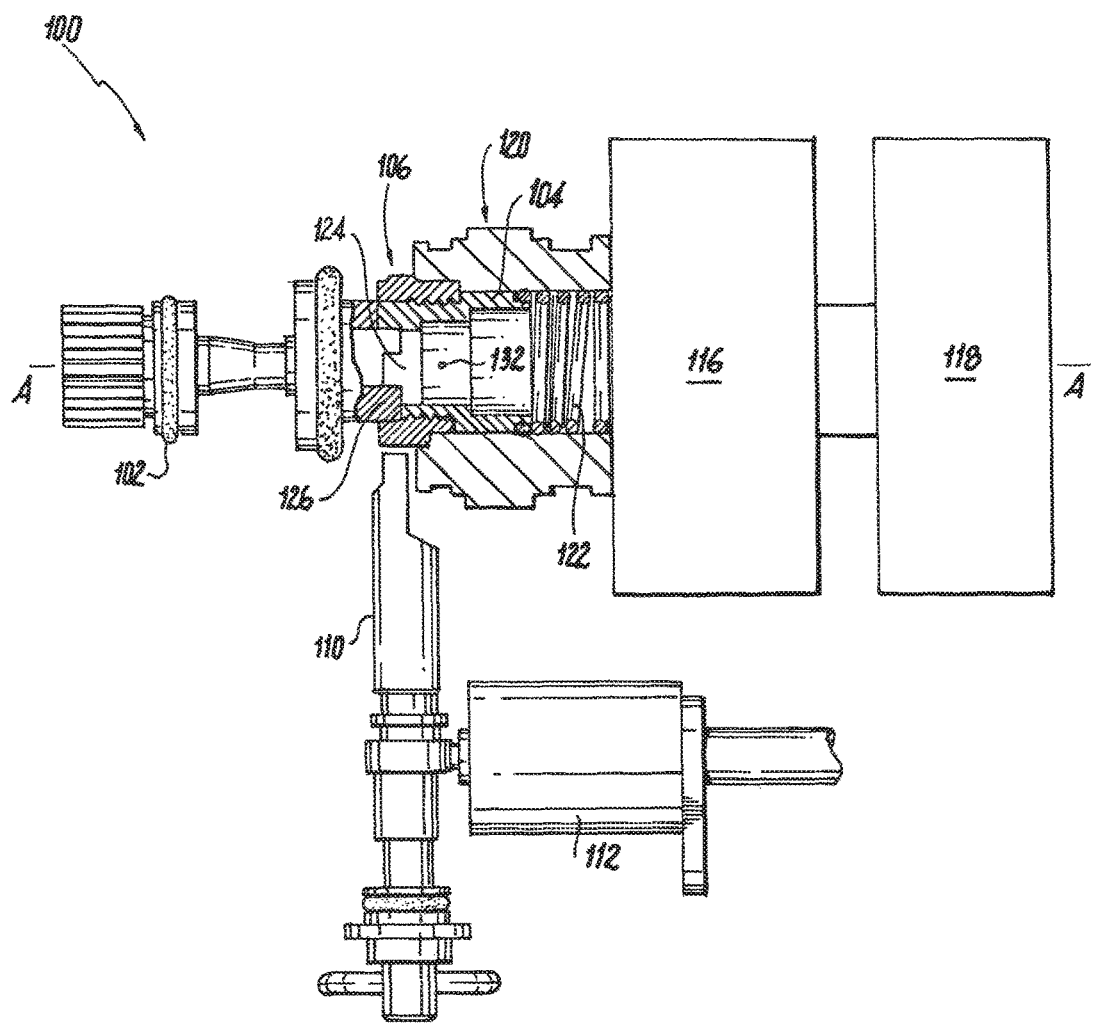
FIG. 1 is a cross-sectional side elevation view of an exemplary embodiment of a disconnect mechanism constructed in accordance with the present disclosure, showing an input shaft, a disconnect shaft, a constant speed transmission, and a generator.

Reference will now be made to the drawings wherein like reference numerals identify similar structural features or aspects of the subject disclosure. For purposes of explanation and illustration, and not limitation, a partial view of an exemplary embodiment of a disconnect mechanism in accordance with the disclosure is shown in FIG. 1 and is designated generally by reference character 100. Other embodiments of disconnect mechanisms in accordance with the disclosure, or aspects thereof, are provided in FIGS. 2-6, as will be described. The systems and methods described herein can be used to disconnect input shafts from driven components, for example, to decouple an input shaft powered by a variable speed gas turbine engine from a constant speed transmission for driving a generator.

Disconnect mechanism 100 includes an input shaft 102 defining a drive axis A. A disconnect shaft 104 is selectably engaged with input shaft 102 to be driven about drive axis A by input shaft 102. Disconnect shaft 104 is connected to drive transmission 116, which in turn drives generator 118. For example, transmission 116 can be a constant speed transmission, which takes a variable speed input from disconnect shaft 104 and drives generator 118 at a substantially constant rate. Load 118 can be a generator, for example, wherein input shaft 102 is driven by a variable speed engine such as a gas turbine engine or the like. In such applications, it may occasionally be desirable to disconnect transmission 116 and generator 118 from input shaft 102. For example, in the case of a gas turbine engine of an aircraft, a pilot or automatic system may disconnect transmission 116 and generator 118 from input shaft 102 such as an over temperature condition, a low oil pressure condition, if the input shaft speed 102 reaches beyond the operational limits of transmission 116 and generator 118, or the like.

Figure 2:
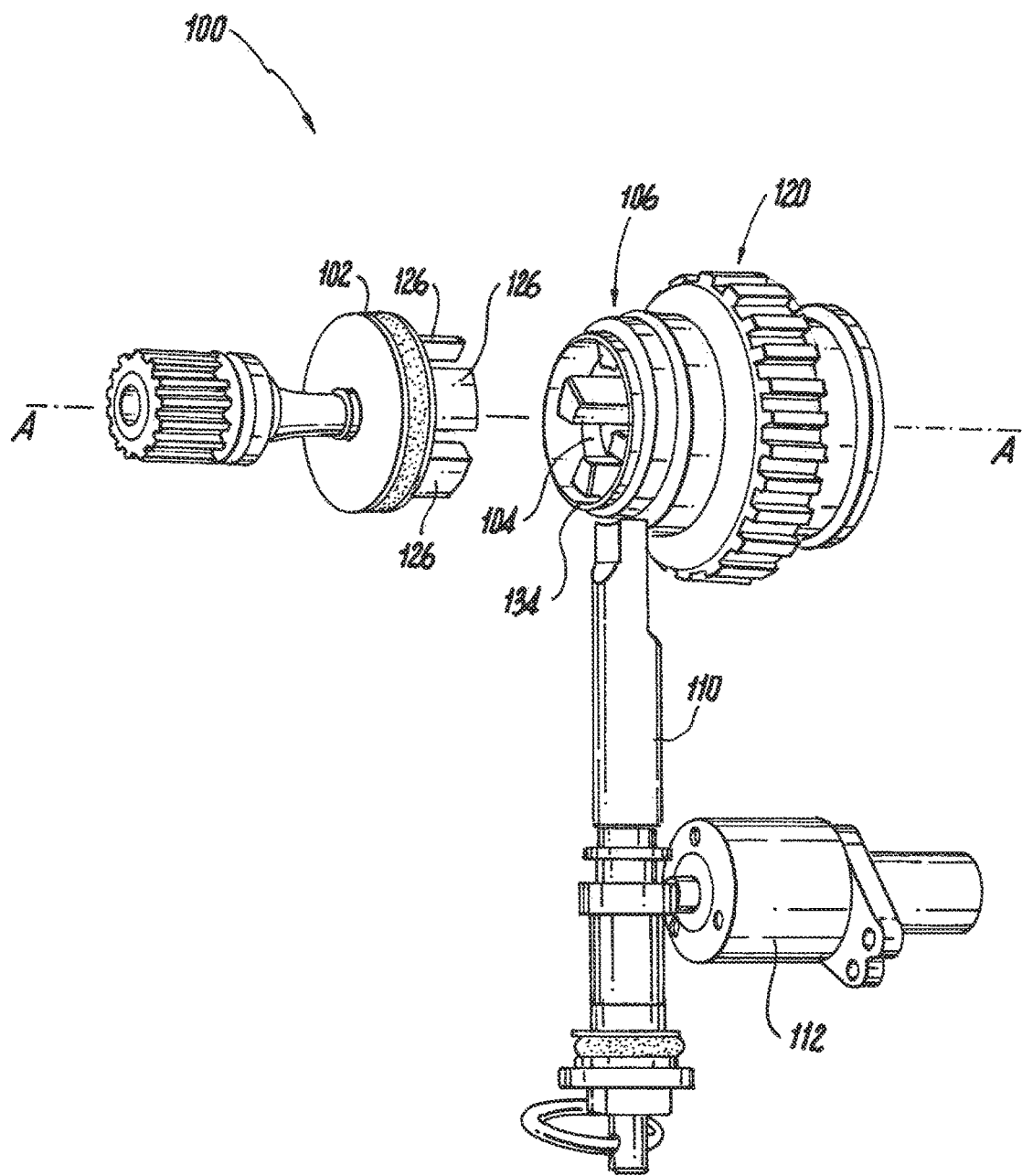
FIG. 2 is an exploded perspective view of a portion of the disconnect mechanism of FIG. 1, showing the input shaft and disconnect shaft separated.

Referring now to FIG. 2, input shaft 102 is shown schematically disconnected from disconnect shaft 104. A disconnect ramp shaft 106 is operatively connected to disconnect shaft 104 to axially move disconnect shaft 104 between a first axial position wherein the disconnect shaft is engaged to the input shaft 102, as shown in FIG. 1, and a second axial position wherein disconnect shaft 104 is disengaged from input shaft 102, as indicated in FIG. 2. The disconnect ramp shaft 106 includes a ramp 108 defined around an outer surface thereof, as identified in FIG. 5.

Figure 3:
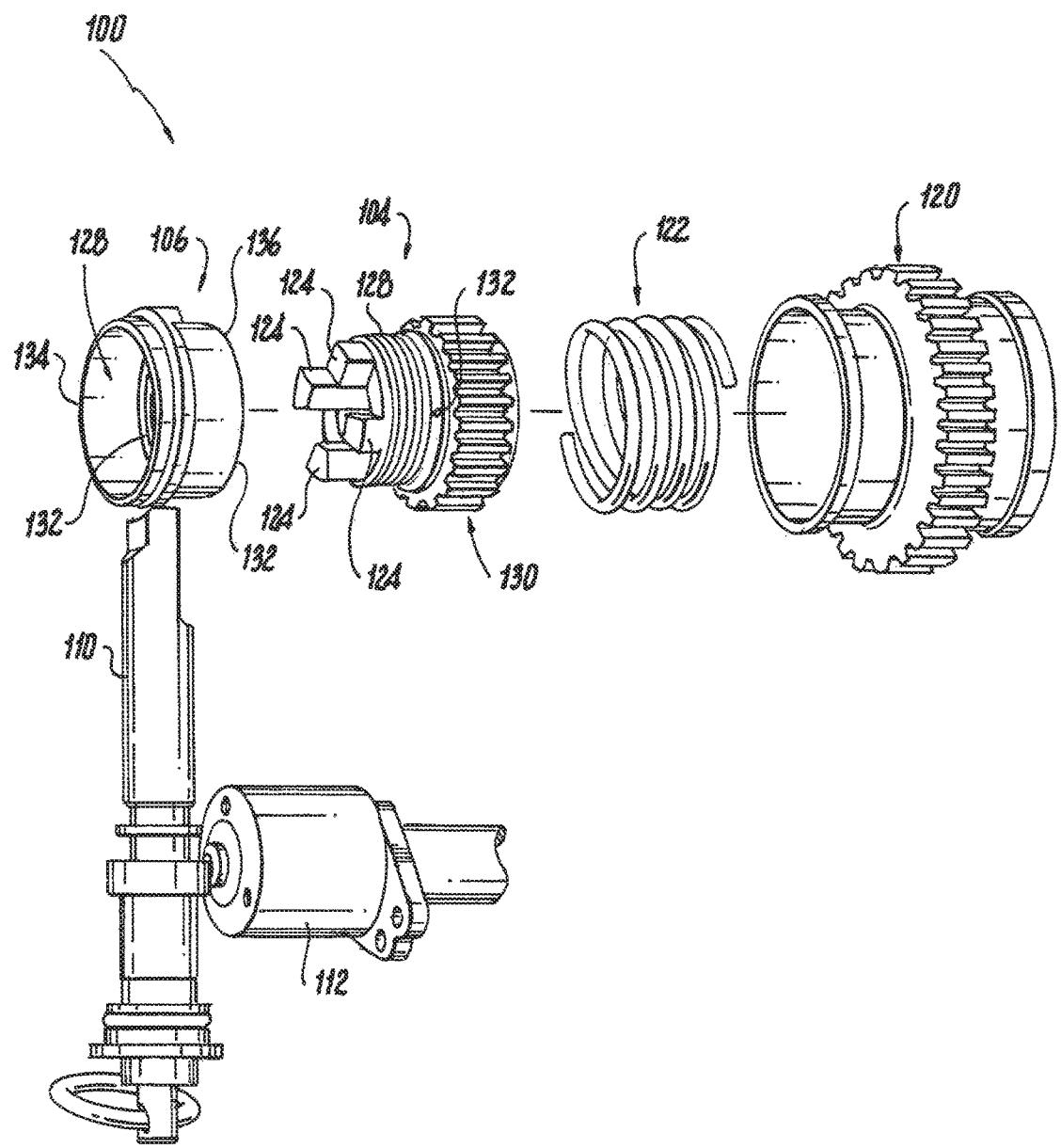
FIG. 3 is an exploded perspective view of a portion of the disconnect mechanism of FIG. 1, showing the input gear and biasing member.

With reference now to FIG. 3, mechanism 100 includes an input gear 120, e.g., for driving transmission 116. Disconnect shaft 104 and disconnect ramp shaft 106 are seated in the input gear 120. As shown in FIG. 3, a biasing member 122 engages input gear 120 and disconnect shaft 104 to bias disconnect shaft 104 toward the first axial position, as shown in FIG. 1. The disconnect shaft 104 is seated in input gear 120 as shown in FIG. 2, wherein disconnect shaft 104 is splined with splines 130, shown in FIG. 3, to the input gear 120 for common rotation with a degree of freedom for axial movement of disconnect shaft 104 relative to input gear 120. Input gear 120 has splines that mate with spines 130, as indicated in FIG. 1.

Disconnect shaft 104 includes dog teeth 124, and input shaft 102 includes mating dog teeth 126, identified in FIG. 1. In the first axial position, dog teeth 124 of disconnect shaft 104 engage the dog teeth 126 of input shaft 102 for common rotation, as shown in FIG. 1, e.g., so input shaft 102 can drive disconnect shaft 104. While four dog teeth 126 are shown, those skilled in the art will readily appreciate that any suitable number of dog teeth can be used, e.g., wherein the input shaft and disconnect shaft have the same number of dog teeth. In the second axial position, dog teeth 124 of disconnect shaft 104 disengage dog teeth 126 of input shaft 104, as indicated in FIG. 2, so input shaft 102 and disconnect shaft 104 are disconnected and can therefore rotate relative to one another, e.g., to allow load 118 to idle. Disconnect ramp shaft 106 includes a first axial end surface 134, as shown in FIG. 3, proximal to input shaft 102 and a second axial end surface 136 distal from input shaft 106, i.e. at the opposite end of disconnect ramp shaft 106 from surface 134. The dog teeth 124 define an axial end surface of disconnect shaft 104, wherein the axial end surface of the disconnect shaft 104 is recessed relative to the first axial end surface 134 of disconnect ramp shaft 106. The recessed dog teeth 124 allow for a potential overall shortening of the length of mechanism 100 along the axis A. Those skilled in the art will readily appreciate that recessing dog teeth 124 is optional, and that much of the benefit of recessing the dog teeth 124 can also be attained by having the dog teeth 124 flush with end surface 134, for example.

Disconnect shaft 104 is seated within disconnect ramp shaft 106, as shown in FIG. 2, and are engaged to one another with threads 128, identified in FIG. 3. The thread direction of threads 128 is configured to tighten with the disconnect pawl in the second pawl position described below so threads 128 tighten rather than loosen when pawl 110 engages ramp 108. Each of the disconnect shaft and the disconnect ramp shaft 104 and 106 define at least one radial passage 132 therethrough for flow of lubricant from within the disconnect shaft 104 to splines 130 of the disconnect shaft and input gear outside the disconnect shaft 104, as indicated in FIGS. 1 and 3.

Figure 4:
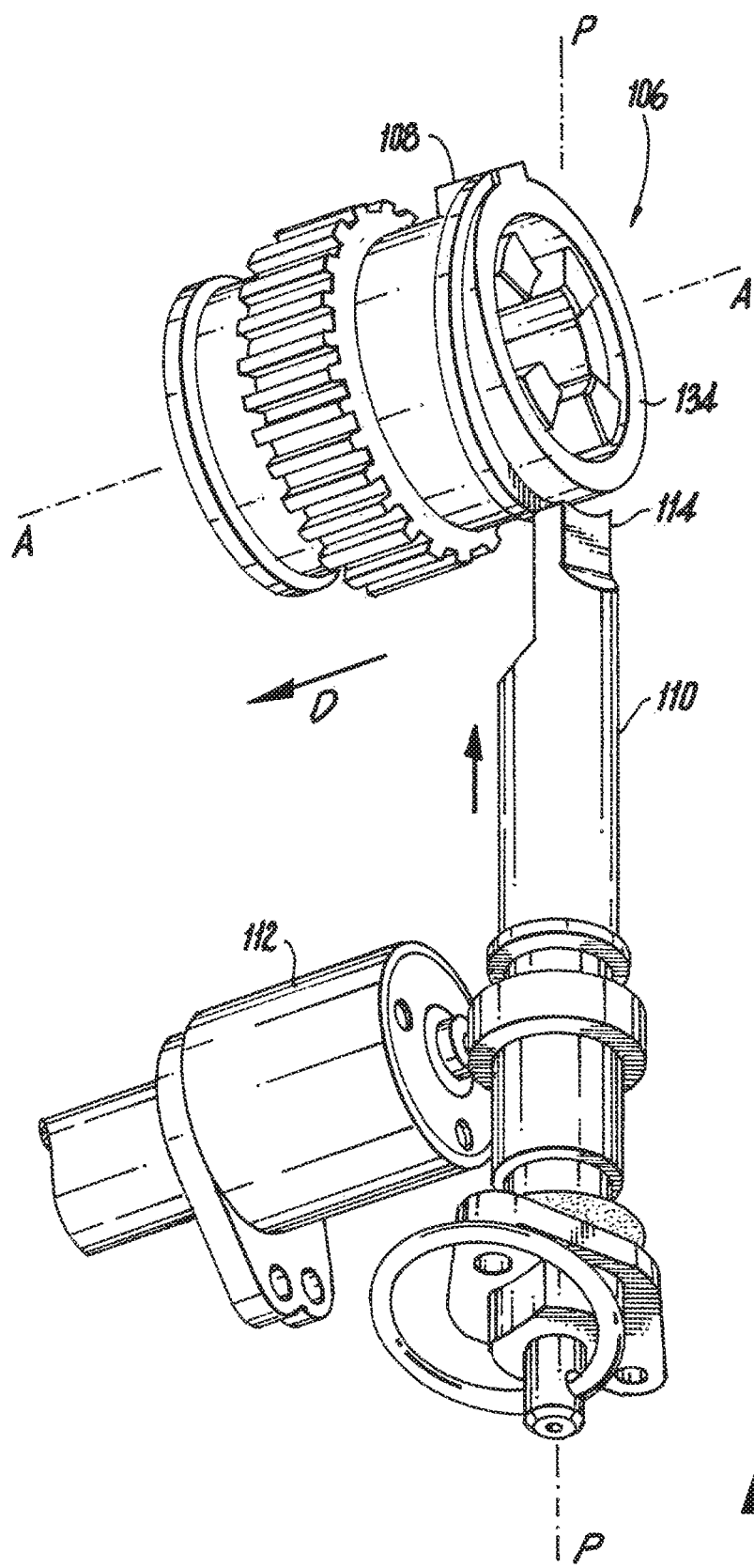
FIG. 4 is a perspective view of a portion of the disconnect mechanism of FIG. 1, showing the disconnect pawl in relation to the ramp of the disconnect ramp shaft.

Referring now to FIG. 4, a disconnect pawl 110 is selectably engaged with the ramp 108 of disconnect ramp shaft 106. In a first pawl position of disconnect pawl 110, disconnect ramp shaft 108 is in the first axial position shown in FIGS. 1-4. In a second pawl position of disconnect pawl 110, disconnect pawl 110 engages the ramp 108 of disconnect ramp shaft 106 to actuate disconnect ramp shaft 106 from the first axial position to the second axial position, disengaging the disconnect shaft 104 from the input shaft 102. Pawl actuator 112, e.g., a solenoid or any other suitable type of actuator, is operatively connected to release the disconnect pawl 110 along a longitudinal pawl axis P defined by the pawl 110 for actuation of the disconnect pawl 110 back and forth between the first and second pawl positions. FIG. 4 shows disconnect pawl 110 in the first pawl position, not in contact with ramp 108. In the second pawl position, disconnect pawl 110 is moved axially along pawl axis P in the direction indicated by the arrow next to disconnect pawl 110 in FIG. 4, so that tip 114 of disconnect pawl 110 contacts ramp 108. As disconnect ramp shaft 106 rotates with disconnect pawl 110 in the second pawl position, the interaction of tip 114 and ramp 108 forces disconnect ramp shaft 106 and disconnect shaft 104 in the axial direction D to disengage the disconnect shaft 104 from input shaft 102. The pawl axis P is shown as being perpendicular to the drive axis A, however any other suitable angle can be used.

Figure 5:
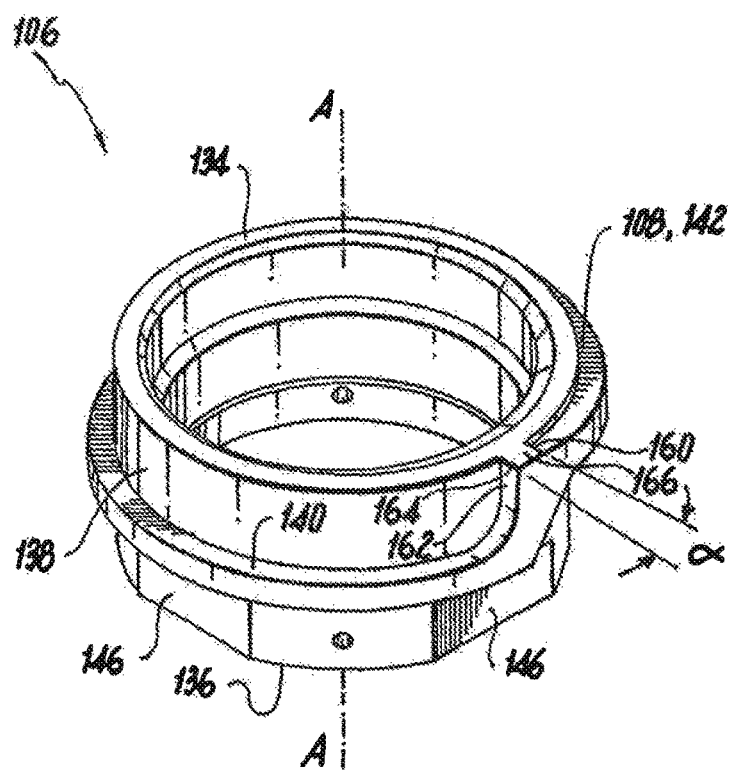
FIG. 5 is a perspective view of the disconnect ramp shaft of FIG. 4, showing the ramp.
Figure 6:
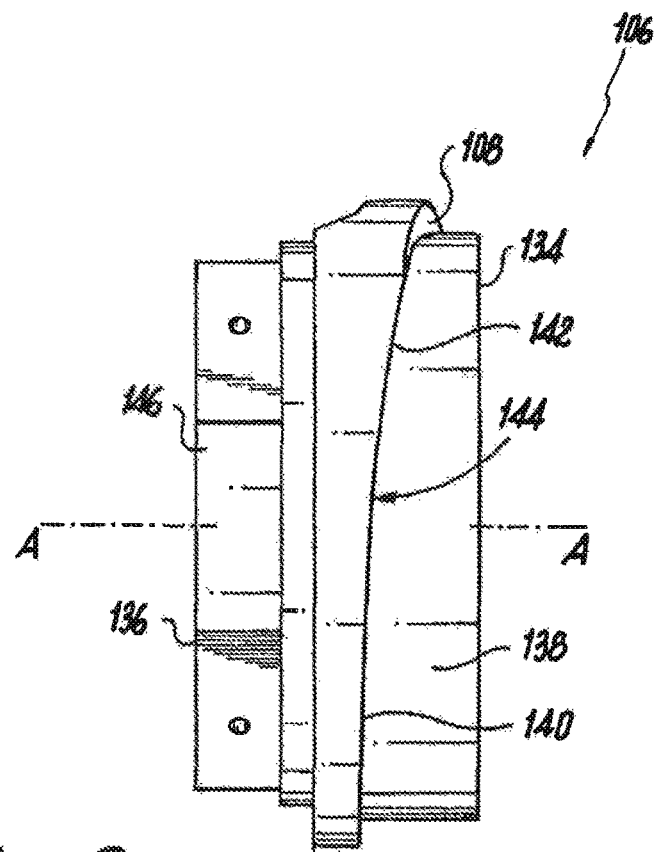
FIG. 6 is a side elevation view of the disconnect ramp shaft of FIG. 4, showing a flat section and a ramping section of the ramp.

With reference now to FIG. 5, disconnect ramp shaft 106 includes an annular ramp body 138, e.g., defined around the drive axis A. Ramp 108 defines a radially extending ledge extending from the outer surface of the ramp body 138. As shown in FIG. 6, ramp 108 includes a flat section 140 that does not ramp axially along axis A, a ramping section 142 that ramps in the axial direction up to a first end 160 of the ramp 108, and a vertical section 162 that extends perpendicular to the flat section 140 at a second end 164 of the ramp 108. The first and second ends 160, 164 of the ramp 108 are circumferentially separated by a flat surface 166 that is parallel to and axially offset from the flat section 140 of the ramp 108. The transition 144 between flat section 140 and ramping section 142 is identified in FIG. 6. Ramp 108 extends circumferentially around the ramp body 138 up to 360° minus an angle α, which is identified in FIG. 5. For example, angle α can be about 4° so the ramp can extend 356° degrees around ramp body 138. Flat section 140 allows for insertion of tip 114 of pawl 110 on the first revolution of disconnect ramp shaft 106 as pawl 110 moves toward the second pawl position. Disconnect ramp shaft 106 includes at least one flat 146 defined on an outer surface thereof for engagement of a tool to tighten or loosen threaded engagement of the disconnect shaft 104 and the disconnect ramp shaft 106.

The methods and systems of the present disclosure, as described above and shown in the drawings, provide for disconnect mechanisms with superior properties including compact axial length and reliable disconnection. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A disconnect mechanism comprising:
an input shaft defining a drive axis;
a disconnect shaft selectably engaged with the input shaft to be driven about the drive axis by the input shaft;
a disconnect ramp shaft operatively connected to the disconnect shaft to axially move the disconnect shaft between a first axial position wherein the disconnect shaft is engaged to the input shaft and a second axial position wherein the disconnect shaft is disengaged from the input shaft, wherein the disconnect ramp shaft includes a ramp defined around an outer surface thereof, wherein the ramp includes a flat section that does not ramp axially along the drive axis, a ramping section that ramps axially along the drive axis up to a first end of the ramp, a vertical section that extends perpendicular to the flat section at a second end of ramp, and wherein the first and second ends of the ramp are circumferentially separated by a flat surface that is parallel to and axially offset from the flat section of the ramp, wherein the ramp extends circumferentially around the annular ramp body up to 360° minus an angle α, and wherein the flat surface separating the first and second ends of the ramp extends circumferentially around the annular ramp by the angle α; and
a disconnect pawl selectably engaged with the ramp of the disconnect ramp shaft by frictional engagement of the disconnect pawl to the disconnect ramp shaft, wherein in a first pawl position of the disconnect pawl the disconnect ramp shaft is in the first axial position, and wherein in a second pawl position of the disconnect pawl, the disconnect pawl engages the ramp of the disconnect ramp shaft to actuate the disconnect ramp shaft from the first axial position to the second axial position, disengaging the disconnect shaft from the input shaft.

2. A disconnect mechanism as recited in claim 1, further comprising an input gear and a biasing member, wherein the disconnect shaft is seated in the input gear, and wherein the biasing member engages the input gear and disconnect shaft to bias the disconnect shaft toward the first axial position.

3. A disconnect mechanism as recited in claim 1, wherein the input shaft includes dog teeth, wherein the disconnect shaft includes dog teeth, wherein in the first axial position, the dog teeth of the disconnect shaft engage the dog teeth of the input shaft for common rotation, and wherein in the second axial position, the dog teeth of the disconnect shaft disengage the dog teeth of the input shaft for relative rotation.

4. A disconnect mechanism as recited in claim 3, wherein the disconnect ramp shaft includes a first axial end surface proximal to the input shaft and a second axial end surface distal from the input shaft, wherein the dog teeth define an axial end surface of the disconnect shaft, and wherein the axial end surface of the disconnect shaft is flush with or recessed relative to the first axial end surface of the disconnect ramp shaft.

5. A disconnect mechanism as recited in claim 1, wherein the disconnect shaft is seated within the disconnect ramp shaft.

6. A disconnect mechanism as recited in claim 5, wherein the disconnect shaft and disconnect ramp shaft are threaded together with a thread direction configured to tighten with the disconnect pawl in the second pawl position.

7. A disconnect mechanism as recited in claim 6, wherein the disconnect ramp shaft includes at least one flat defined on an outer surface thereof for engagement of a tool to tighten threaded engagement of the disconnect shaft and the disconnect ramp shaft.

8. A disconnect mechanism as recited in claim 1, further comprising an input gear wherein the disconnect shaft is seated in the input gear, wherein the disconnect shaft is splined to the input gear for common rotation with a degree of freedom for axial movement of the disconnect shaft relative to the input gear.

9. A disconnect mechanism as recited in claim 8, wherein the disconnect shaft is seated within the disconnect ramp shaft, and wherein each of the disconnect shaft and the disconnect ramp shaft define at least one radial passage therethrough for flow of lubricant from within the disconnect shaft to splines of the disconnect shaft and input gear outside the disconnect shaft.

10. A disconnect mechanism as recited in claim 1, further comprising a pawl actuator operatively connected to release the disconnect pawl along a longitudinal pawl axis defined by the pawl for actuation of the disconnect pawl back and forth between the first and second pawl positions.

11. A disconnect mechanism as recited in claim 1, wherein the pawl axis is perpendicular to the drive axis.

12. A disconnect ramp shaft comprising:
an annular ramp body defining a drive axis; and
a ramp defined around an outer surface of the annular ramp body;
wherein the ramp includes a flat section that does not ramp axially along the drive axis, a ramping section that ramps axially along the drive axis up to a first end of the ramp, a vertical section that extends perpendicular to the flat section at a second end of ramp, and wherein the first and second ends of the ramp are circumferentially separated by a flat surface that is parallel to and axially offset from the flat section of the ramp, wherein the ramp extends circumferentially around the annular ramp body up to 360° minus an angle α, and wherein the flat surface separating the first and second ends of the ramp extends circumferentially around the annular ramp by the angle α.

13. The disconnect ramp shaft as recited in claim 12, wherein the ramp defines a radially extending ledge extending from the outer surface of the annular ramp body.

14. The disconnect ramp shaft as recited in claim 12, wherein the ramp extends circumferentially 356 degrees around the annular ramp body.

15. The disconnect mechanism of claim 1, wherein the angle α is 4° and the ramp extends 356° around the annular ramp body.

* * * * *